United States Patent
Koo et al.

(10) Patent No.: US 9,727,674 B2
(45) Date of Patent: Aug. 8, 2017

(54) METHOD OF OPERATING SIMULATOR COMPENSATING FOR DELAY AND DEVICE FOR PERFORMING THE SAME

(71) Applicants: Jong Eun Koo, Hwseong-si (KR); Young Jin Gu, Yongin-si (KR); In Youl Lee, Suwon-si (KR)

(72) Inventors: Jong Eun Koo, Hwseong-si (KR); Young Jin Gu, Yongin-si (KR); In Youl Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1 day.

(21) Appl. No.: 14/887,789

(22) Filed: Oct. 20, 2015

(65) Prior Publication Data

US 2016/0110483 A1 Apr. 21, 2016

(30) Foreign Application Priority Data

Oct. 21, 2014 (KR) ........................ 10-2014-0142459

(51) Int. Cl.
*G06F 17/50* (2006.01)

(52) U.S. Cl.
CPC ...... *G06F 17/5009* (2013.01); *G06F 17/5022* (2013.01); *G06F 17/5031* (2013.01); *G06F 17/5036* (2013.01); *G06F 17/5081* (2013.01); *G06F 2217/82* (2013.01); *G06F 2217/84* (2013.01)

(58) Field of Classification Search
CPC ....................................................... G06F 17/50
USPC ....................................................... 716/113
See application file for complete search history.

(56) References Cited

U.S. PATENT DOCUMENTS

| | | |
|---|---|---|
| 6,817,000 B2 | 11/2004 | Rich et al. |
| 7,228,515 B2 | 6/2007 | Querbach et al. |
| 7,239,997 B2 | 7/2007 | Yonezawa |
| 8,504,346 B1 | 8/2013 | Kolpekwar et al. |
| 8,571,837 B1 | 10/2013 | Hou |
| 8,601,412 B1 | 12/2013 | O'Riordan et al. |
| 8,661,402 B2 | 2/2014 | Bhushan et al. |
| 8,732,630 B1 | 5/2014 | Kolpekwar et al. |
| 2003/0125918 A1 | 7/2003 | Rich et al. |
| 2008/0244488 A1* | 10/2008 | Okumura ............ G06F 17/5031 716/113 |
| 2009/0157376 A1 | 6/2009 | Hollis |

FOREIGN PATENT DOCUMENTS

| | | |
|---|---|---|
| JP | 2006113796 | 4/2006 |
| JP | 20070086939 | 4/2007 |

* cited by examiner

*Primary Examiner* — Thuan Do
(74) *Attorney, Agent, or Firm* — Volentine & Whitt, PLLC

(57) ABSTRACT

A simulator includes a memory for storing a first netlist, a timing library, and a standard parasitic exchange format (SPEF) file; and a processor configured to compensate for delay to synchronize digital and analog signals. The processor includes a delay calculator module for generating one of a rising time and a falling time and a standard delay format (SDF) file using the first netlist, the timing library, and the SPEF file; an SDF file converter module for adjusting an interconnect delay description included in the SDF file to compensate for delay using the one of the rising time and the falling time; and a digital simulator module for generating an event using a first driving cell according to a compensated interconnect delay description.

20 Claims, 12 Drawing Sheets

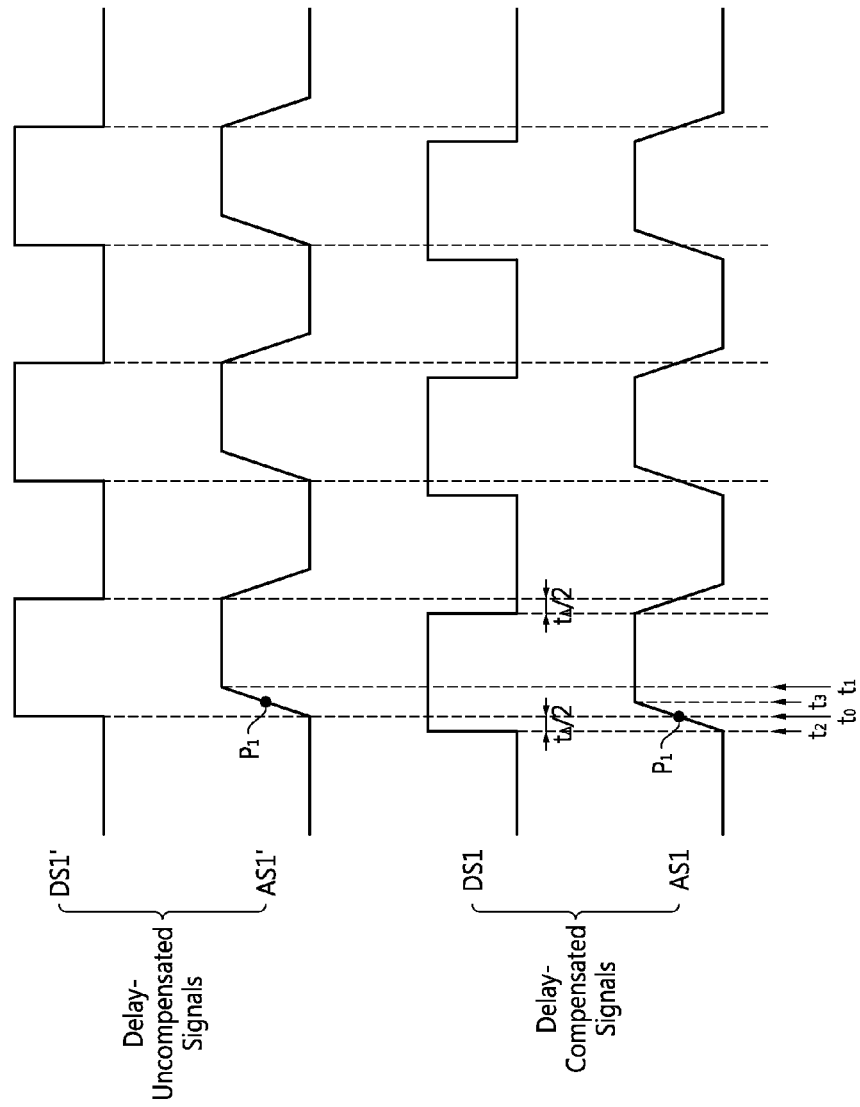

METHOD OF OPERATING SIMULATOR COMPENSATING FOR DELAY AND DEVICE FOR PERFORMING THE SAME

CROSS-REFERENCE TO RELATED APPLICATION

A claim for priority under 35 U.S.C. §119 is made to Korean Patent Application No. 10-2014-0142459 filed on Oct. 21, 2014, in the Korean Intellectual Property Office, the entire contents of which are hereby incorporated by reference.

BACKGROUND

Embodiments of the inventive concept relate to a method of operating a simulator, and more particularly, to a method of operating a simulator capable of synchronizing a digital signal with an analog signal by compensating for an interconnect delay description included in a standard delay format (SDF) file and a simulation device for performing the method.

Electronic design automation (EDA) is a technique of designing and producing various electronic devices from a printed circuit board (PCB) to an embedded circuit. A mixed-signal simulation tool of EDA is usually used to verify semiconductor designs, such as semiconductor memory or system on chip (SoC).

A mixed-signal simulator may include a Verilog simulator for a digital domain and a simulation program with integrated circuit emphasis (SPICE) for an analog domain. A Verilog simulator and SPICE are used for digital-to-analog (D/A) signal conversion and analog-to-digital (A/D) signal conversion. However, D/A signal conversion or A/D signal conversion may cause a timing error when the digital domain and the analog domain are connected with each other. Such timing error may decrease the accuracy of digital or analog modeling.

SUMMARY

According to various embodiments of the inventive concept, there is provided a method of operating a simulator while compensating for delay from at least one of digital-to-analog signal conversion and analog-to-digital signal conversion for synchronizing digital and analog signals. The method includes generating one of a rising time and a falling time and a standard delay format (SDF) file using a first netlist, a timing library, and a standard parasitic exchange format (SPEF) file; adjusting an interconnect delay description included in the SDF file to compensate for delay using the one of the rising time and the falling time; and generating an event using a first driving cell according to a compensated interconnect delay description.

The first netlist may be a netlist of Verilog. The SDF file may be defined in Institute of Electrical and Electronics Engineers (IEEE) Standard 1497.

The interconnect delay description may include a delay of at least one interconnect connected to at least one terminal among input and output terminals of the first driving cell.

The method may further include generating an analog signal using the event and the one of the rising time and the falling time using an interface simulator; and driving a first driven cell using the analog signal using an analog simulator. The generated analog signal may reflect the one of the rising time and the falling time corresponding to the event. The analog simulator is a simulation program with integrated circuit emphasis (SPICE).

Adjusting the interconnect delay description may be based on a difference between the interconnect delay description and the one of the rising time and the falling time. Adjusting the interconnect delay description may be based on equation A=C−B/2, where A is the adjusted interconnect delay description, C is the interconnect delay description, and B is the one of the rising time and the falling time.

The SPEF file may be supported by at least part of Institute of Electrical and Electronics Engineers (IEEE) Standard 1481-1999.

The method may further include generating an effective capacitance load using the first netlist and the timing library; generating a new netlist using a second netlist and the effective capacitance load; and generating an analog signal reflecting the effective capacitance load using a second driving cell according to the new netlist.

According to other embodiments of the inventive concept, there is provided a non-transitory computer-readable recording medium containing a computer program, executable by a processing device, for compensating for delay to synchronize digital and analog signals a simulator. The computer readable medium includes a delay calculating code segment for generating one of a rising time and a falling time, and a standard delay format (SDF) file using a first netlist, a timing library and a standard parasitic exchange format (SPEF) file; an SDF file converting code segment for adjusting an interconnect delay description included in the SDF file to compensate for delay using the one of the rising time and the falling time; and a digital simulator code segment for generating an event using a first driving cell according to a compensated interconnect delay description.

The delay calculating code may further generate an effective capacitance load using the first netlist and the timing library. Also, the computer-readable medium may further include a netlist converter code segment for generating a new netlist using a second netlist and the effective capacitance load, and an analog simulator code segment for generating an analog signal reflecting the effective capacitance load using a second driving cell according to the new netlist.

According to other embodiments of the inventive concept, there is provided a simulation device including a memory configured to store a simulator program, and a processor configured to execute the simulator program stored in the memory. When executed by the processor, the simulator program generates one of a rising time and a falling time and a standard delay format (SDF) file using a first netlist, a timing library, and a standard parasitic exchange format (SPEF) file; modifies an interconnect delay description included in the SDF file using the one of the rising time and the falling time; and generates an event for controlling an operation of a first driving cell using the modified interconnect delay description.

The simulation program may generate an analog signal using the generated event and the one of the rising time and the falling time, and may drive a driven cell using the analog signal. The modified interconnect delay description may correspond to a difference between the interconnect delay description and the one of the rising time and the falling time.

The interconnect delay description may be modified according equation A=C−B/2, where A is the modified interconnect delay description, C is the interconnect delay description, and B is the one of the rising time and the falling time. The simulation program may generate an effective capacitance load using the first netlist and the timing library, generate a new netlist using a second netlist and the effective capacitance load, and generate an analog signal reflecting the effective capacitance load using a second driving cell based on the new netlist.

According to other embodiments of the inventive concept, there is provided a simulator including a memory for storing a first netlist, a timing library, and a standard parasitic exchange format (SPEF) file; and a processor configured to compensate for delay to synchronize digital and analog signals. The processor includes a delay calculator module for generating one of a rising time and a falling time and a standard delay format (SDF) file using the first netlist, the timing library, and the SPEF file; an SDF file converter module for adjusting an interconnect delay description included in the SDF file to compensate for delay using the one of the rising time and the falling time; and a digital simulator module for generating an event using a first driving cell according to a compensated interconnect delay description.

The interconnect delay description includes a delay of at least one interconnect connected to at least one terminal among input and output terminals of the first driving cell.

The simulator may further include an interface simulator module for generating an analog signal using the event and the one of the rising time and the falling time, and an analog simulator module for driving a first driven cell using the analog signal.

Generating the analog signal may include the interface simulator generating the analog signal reflecting the one of the rising time and the falling time corresponding to the event.

The SDF file converter module may adjust the interconnect delay description based on a difference between the interconnect delay description and the one of the rising time and the falling time. The SDF file converter module may adjust the interconnect delay description based on equation A=C−B/2, where A is the adjusted interconnect delay description, C is the interconnect delay description, and B is the one of the rising time and the falling time.

The digital simulator module may be formed with a hardware description language (HDL). The digital simulator module may be formed with a Verilog HDL.

The delay calculator module, the SDF file converter module, and the digital simulator module may be implemented using software programs executable by a central processing unit (CPU). The analog simulator module may include integrated circuit emphasis (SPICE). The SPEF file may be supported by at least part of Institute of Electrical and Electronics Engineers (IEEE) Standard 1481-1999.

The delay calculator module may further generate an effective capacitance load using the first netlist and the timing library. Also, the simulator may further include a netlist converter module for generating a new netlist using a second netlist and the effective capacitance load, and an analog simulator module for generating an analog signal reflecting the effective capacitance load using a second driving cell according to the new netlist.

BRIEF DESCRIPTION OF THE DRAWINGS

Exemplary embodiments of the inventive concept will become more apparent from the following description taken in conjunction with the accompanying drawings, in which:

FIG. 7 is a timing chart of delay-uncompensated signals and delay-compensated signals illustrated in FIG. 6, according to various embodiments of the inventive concept;

DETAILED DESCRIPTION OF THE EMBODIMENTS

Figure 1:
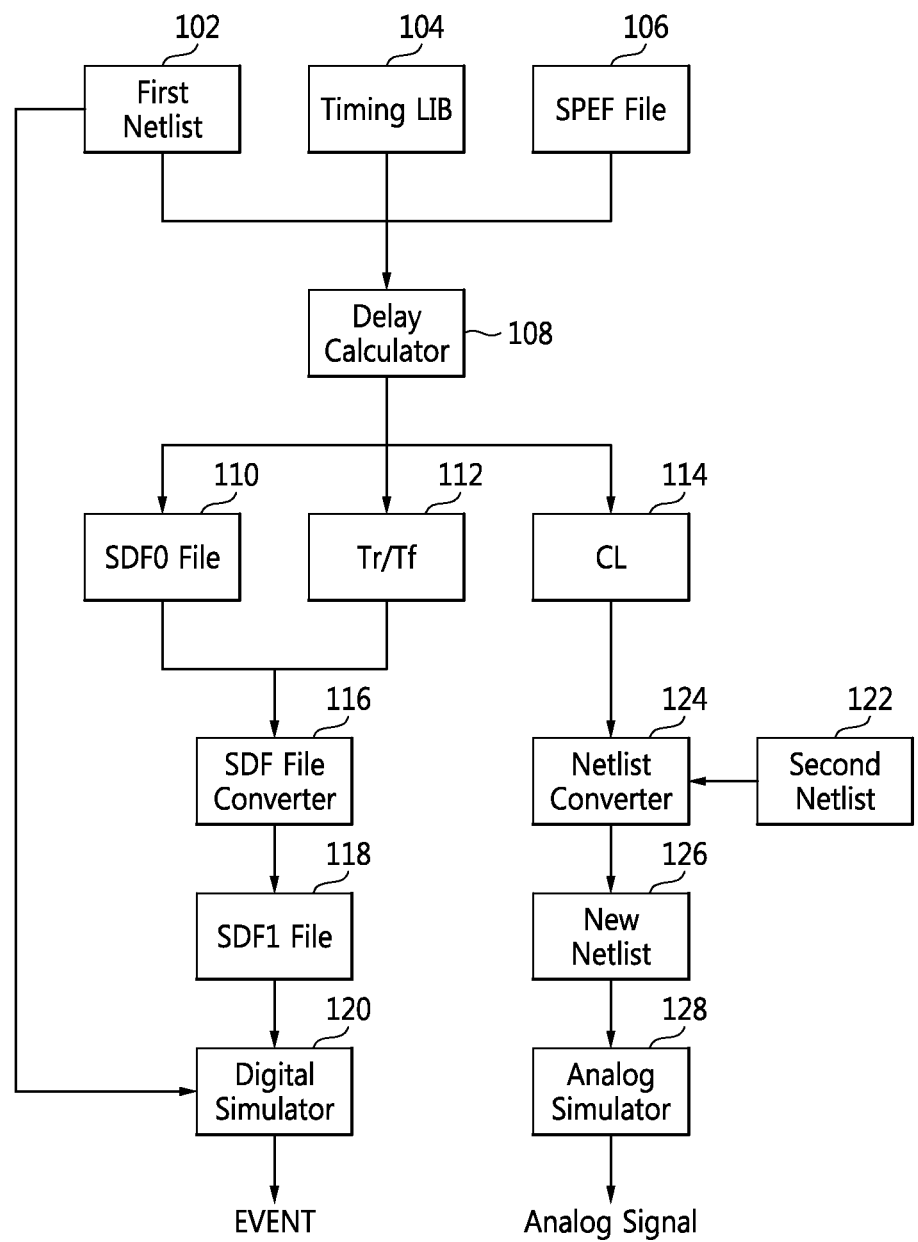
FIG. 1 is a schematic block diagram for explaining a method of operating a simulator device, according to various embodiments of the inventive concept.

Embodiments will be described in detail with reference to the following description and accompanying drawings. The inventive concept, however, may be embodied in various different forms, and should not be construed as being limited only to the illustrated embodiments. Rather, these embodiments are provided as examples so that this disclosure will be thorough and complete, and will fully convey the inventive concept to one of ordinary skill in the art. Accordingly, known processes, elements, and techniques are not described with respect to some of the embodiments. In the drawings, the size and relative sizes of layers and regions may be exaggerated for clarity. Unless otherwise noted, like reference numerals denote like elements throughout the attached drawings and written description, and thus descriptions may not be repeated.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "exemplary" is intended to refer to an example or illustration.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 2:
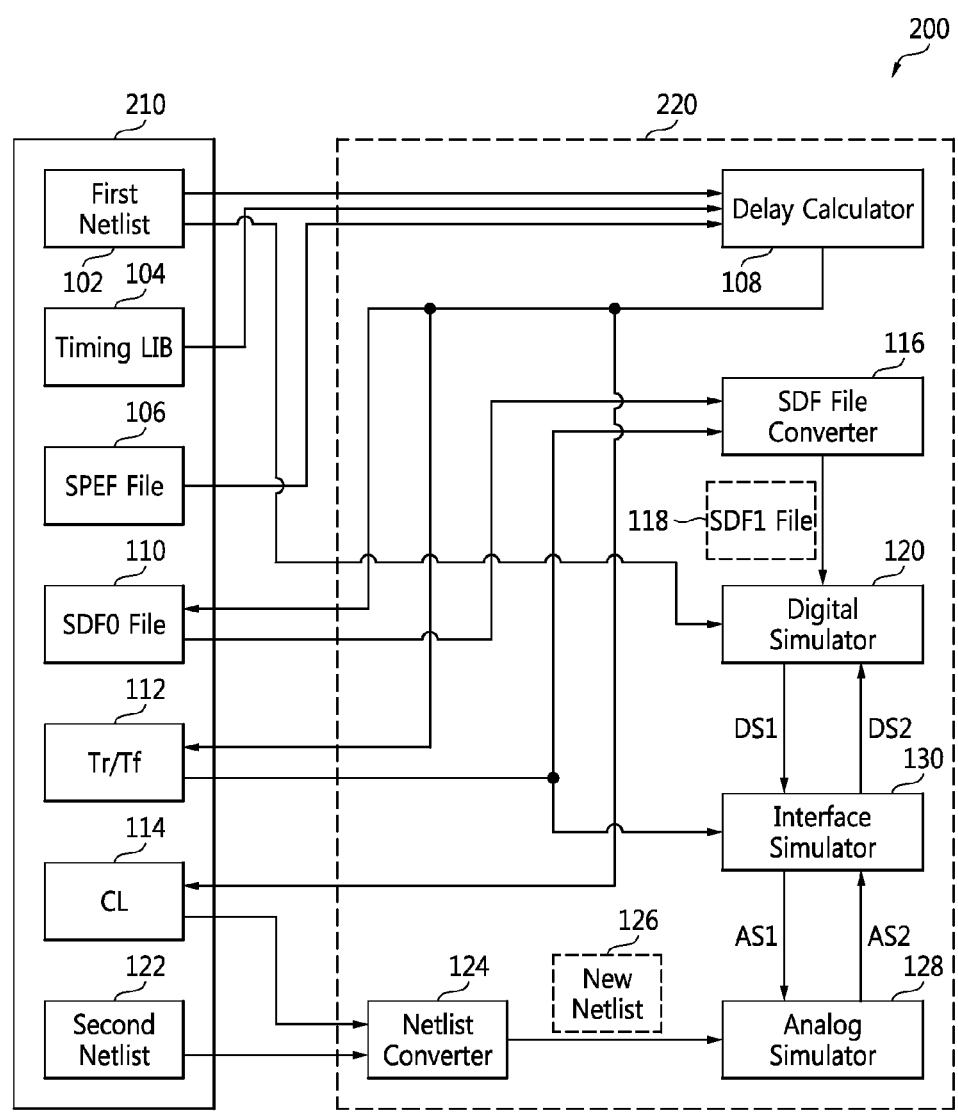
FIG. 2 is a block diagram of a simulation device, according to various embodiments of the inventive concept.

FIG. 1 is a schematic block diagram for explaining a method of operating a simulator device according to various embodiments of the inventive concept. FIG. 2 is a block diagram of a simulation device 200 according to various embodiments of the inventive concept. The simulation device 200 may be called a simulator. The term "simulator" may refer to a hardware device that can perform a function and operation corresponding to its name, computer program code and/or code segments for performing a certain function and operation, or a non-transitory electronic recording medium containing program code and/or code segments for performing certain functions and operations.

Referring to FIGS. 1 and 2, a delay calculator 108 generates a first standard delay format (SDF0) file 110, one of rising time and falling time (Tr/Tf) 112, and an effective capacitance load (CL) 114 using a first netlist 102, a timing library (LIB) 104, and a standard parasitic exchange format (SPEF) file 106, which are read from a memory 210. The delay calculator 108 generates the SDF0 file 110 using cell delay description provided by the timing LIB 104 and interconnect delay description provided by the SPEF file 106. The delay calculator 108 may store the SDF0 file 110 in the memory 210.

The delay calculator 108 performs an operation (e.g., addition or summation) on the cell delay description provided by the timing LIB 104 and the interconnect delay description provided by the SPEF file 106 according to connections among elements provided by the first netlist 102. The delay calculator 108 may calculate a capacitance corresponding to the operation result, and may store the capacitance in the memory 210. The delay calculator 108 may set the capacitance as an effective CL. For example, the effective CL may represent a capacitance value. For example, each of the elements may include a resistor, an inductor, a capacitor, a buffer, or an inverter.

The first netlist 102, the timing LIB 104, the SPEF file 106, the SDF0 file 110, the Tr/Tf 112, and the effective CL 114 may refer to file formats used in electronic design automation (EDA). For example, the first netlist 102 may be a netlist of a Verilog hardware description language standardized in IEEE Standard 1364, IEEE Standard Hardware Description Language Based on the Verilog® Hardware Description Language, which is hereby incorporated by reference, but is not restricted thereto.

The first netlist 102 may contain or include information such as a gate level or a transistor level in the digital domain. The timing LIB 104 may store a delay description of a cell included in the digital domain, such as a delay (or a delay value) of an inverter, for example. The SPEF file 106 may contain or include an interconnect delay description of interconnection of cells in the digital domain. For example, the SPEF file 106 may be supported by at least part of IEEE Standard 1481-1999, for integrated circuit delay and power calculation system.

The SDF0 file 110 may contain or include information about the cell delay description in the timing LIB 104 and the interconnect delay description in the SPEF file 106. For example, the SDF0 file 110 may be a standard delay format file defined in IEEE Standard 1497, but is not restricted thereto.

The Tr/Tf 112 refers to at least one of a rising time and a falling time of an analog signal corresponding to an event EVENT generated in the digital domain. In various embodiments, the Tr/Tf 112 may be determined depending on ambient temperature or operating temperature, for example. Also, for example, the delay calculator 108 may generate the Tr/Tf 112 at a node, to which at least one of the elements (e.g., a capacitor, an inductor, and a resistor) of the first netlist 102 is connected, using the timing LIB 104. The CL 114 refers to effective capacitance corresponding to delay occurring in the digital domain.

In digital-to-analog signal conversion, the digital domain may include a region including a first driving cell implemented as a digital circuit, and the analog domain may include a region including a first driven cell implemented as an analog circuit.

Figure 3:
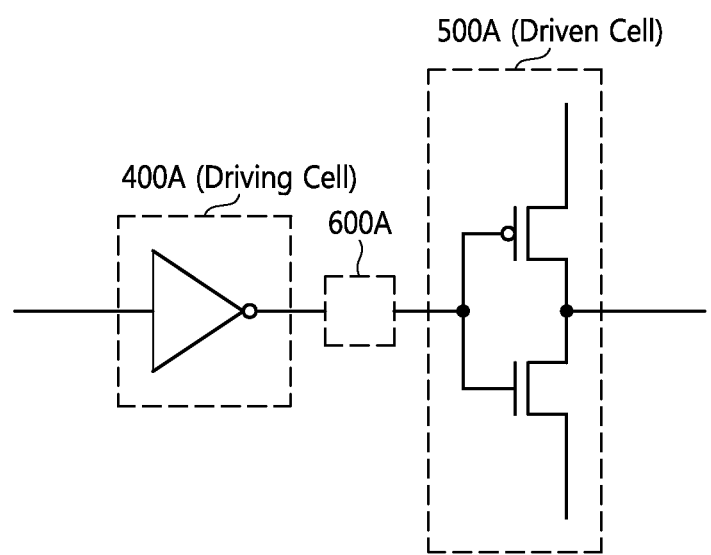
FIG. 3 is a diagram of a circuit including a first driven cell driven by a first driving cell for digital-to-analog signal conversion.

Referring to FIG. 3, a first driving cell 400A is connected to a first driven cell 500A via an interface region 600A, discussed below. An SDF file converter 116 generates a second standard delay format (SDF1) file 118 using the SDF0 file 110 and the Tr/Tf 112. The SDF1 file 118 is obtained by adjusting for delay compensation the interconnect delay description among the cell delay description and the interconnect delay description included in the SDF0 file 110. The SDF1 file 118 may be stored in the memory 210, for example.

For example, when a first driving cell and a first driven cell are connected by a simulator with each other through an interface region, delay may occur in the interface region between the first driving cell and the first driven cell. The delay may correspond to Tr or Tf of an analog signal, for example. The SDF file converter 116 may change the interconnect delay description based on the delay. The SDF file converter 116 may also adjust the interconnect delay description based on the difference between the interconnect delay description and one of Tr and Tf. The operations of the SDF file converter 116 will be described in detail with reference to FIGS. 5 and 6.

A digital simulator 120 generates an event EVENT using the first netlist 102 and the SDF1 file 118. Here, the event may include "0 (i.e., logic 0)," "1 (i.e., logic 1)," "X (i.e., unknown)" or "Hi-Z (i.e., high-impedance)," although the inventive concept is not restricted thereto. A first event EVENT, for example DS1 generated by the digital simulator 120, may be converted into a first analog signal AS1 by an interface simulator 130, which will be described with reference to FIG. 2. The first analog signal AS1 is input to the first driven cell and an analog simulator 128 may perform analog simulation using the first analog signal AS1.

In various embodiments, the digital simulator 120 may be formed using hardware description language (HDL), but the inventive concept is not restricted to this example. The digital simulator 120 may be formed with a Verilog HDL, but the inventive concept is not restricted to this example. The digital simulator 120 may generate the first event EVENT, for example DS1, by applying connections of the elements of the first netlist 102 to the delay-compensated (or delay-reflected) SDF1 file 118.

Figure 6:
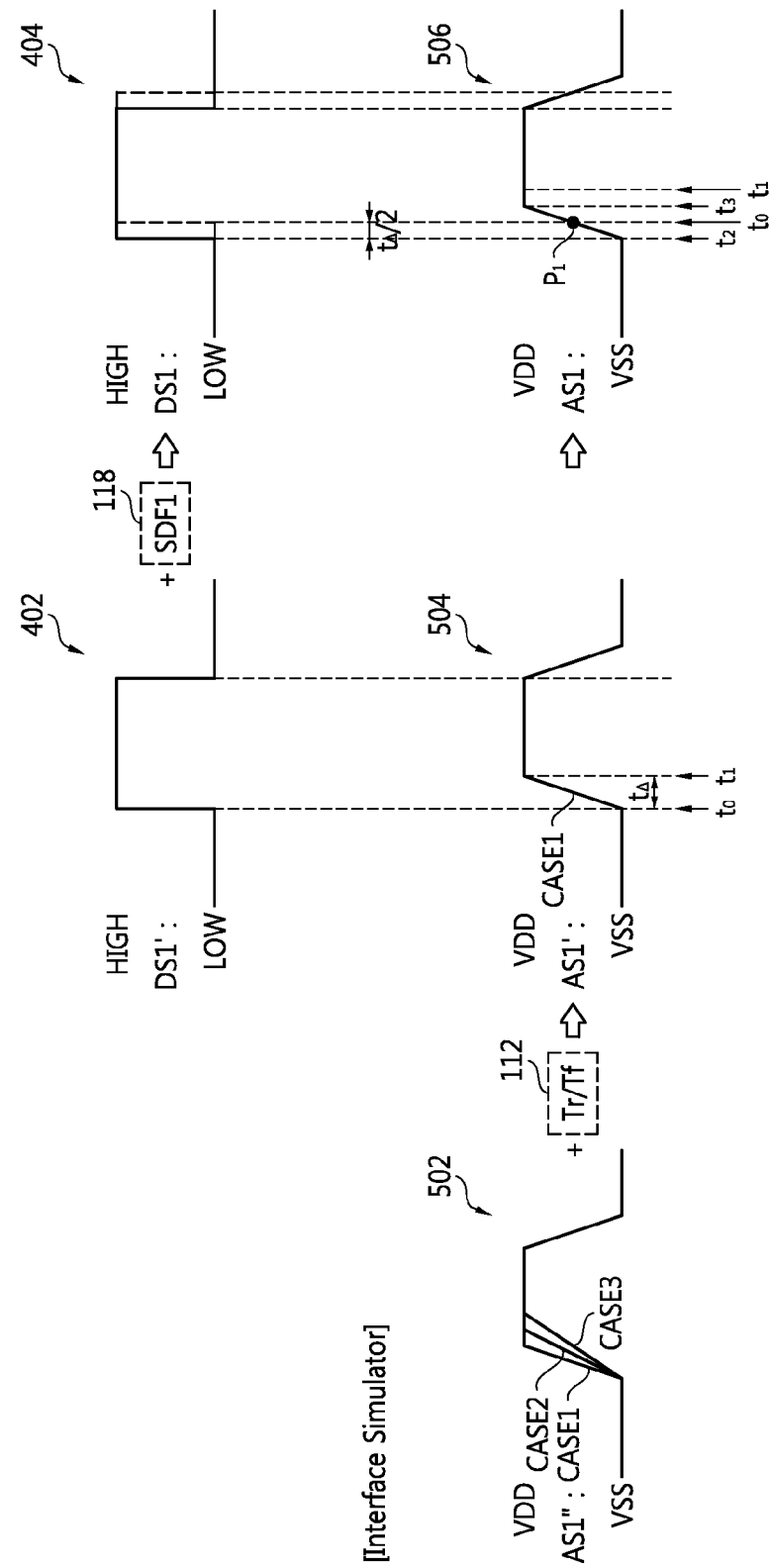
FIG. 6 is a diagram of a delay-compensated event in accordance with a delay-compensated interconnect delay description and a first analog signal corresponding to the event, according to various embodiments of the inventive concept.

For example, as shown in FIG. 6, a delay difference corresponding to the interconnect delay description may occur between the first analog signal AS1 corresponding to the first event DS1 generated using the SDF1 file 118 and an analog signal AS1' corresponding to an event DS1' generated using the SDF0 file 110. In other words, the first analog signal AS1 corresponding to the first event DS1 may lead the analog signal AS1' corresponding to the event DS1' by the interconnect delay description to compensate for delay. Accordingly, when the digital simulator 120 performs digital simulation using the delay-compensated SDF1 file 118, an event and an analog signal are synchronized with each other without an error, and therefore, the accuracy of the simulation increases.

Figure 8A:
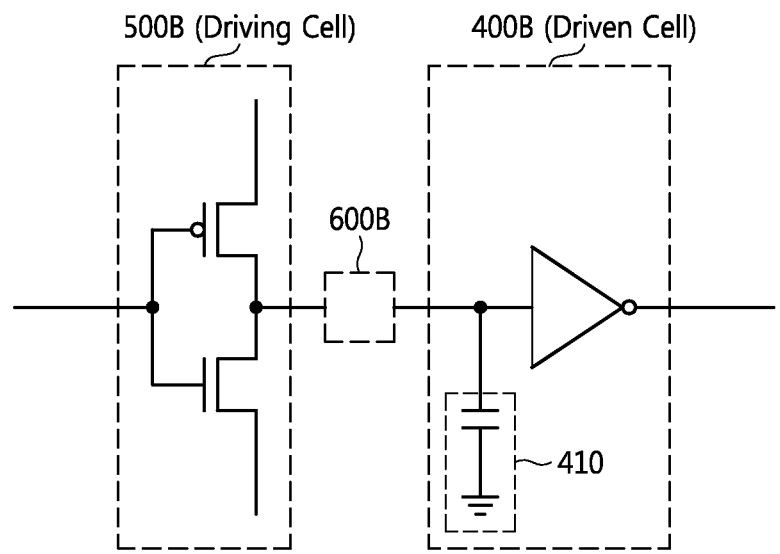
FIG. 8A is a diagram of a conventional circuit including a second driven cell driven by a second driving cell for analog-to-digital signal conversion.
Figure 8B:
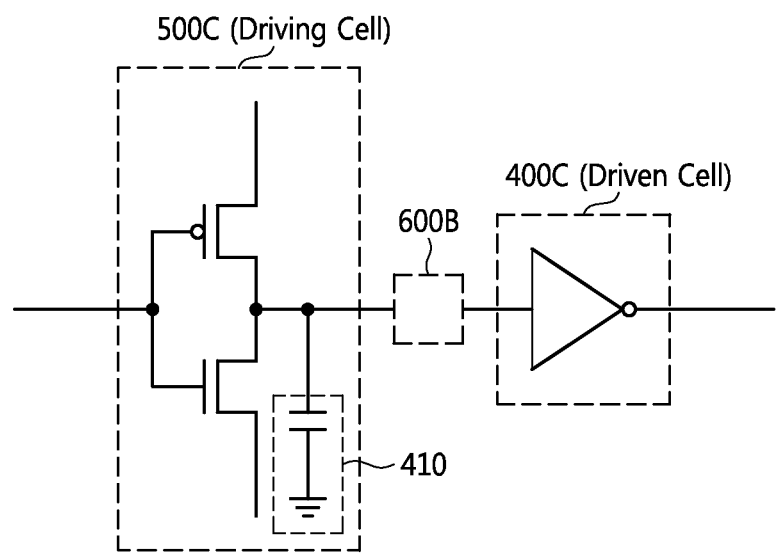
FIG. 8B is a diagram of a circuit including a second driven cell driven by a second driving cell for analog-to-digital signal conversion, according to various embodiments of the inventive concept.

In analog-to-digital signal conversion, with reference to FIG. 8B, the analog domain may include a region including a second driving cell 500C implemented as an analog circuit and the digital domain may include a region including a second driven cell 400C implemented as a digital circuit.

A netlist converter 124 may generate a new netlist 126 using the CL 114 and a second net list 122 regarding a second driving cell. For example, the second net list 122 may be a netlist of a simulation program with integrated circuit emphasis (SPICE), but the inventive concept is not restricted to this example. The new netlist 126 may be obtained by compensating the second net list 122 for the CL 114. The new netlist 126 will be described with reference to FIGS. 8A and 8B.

Figure 10:
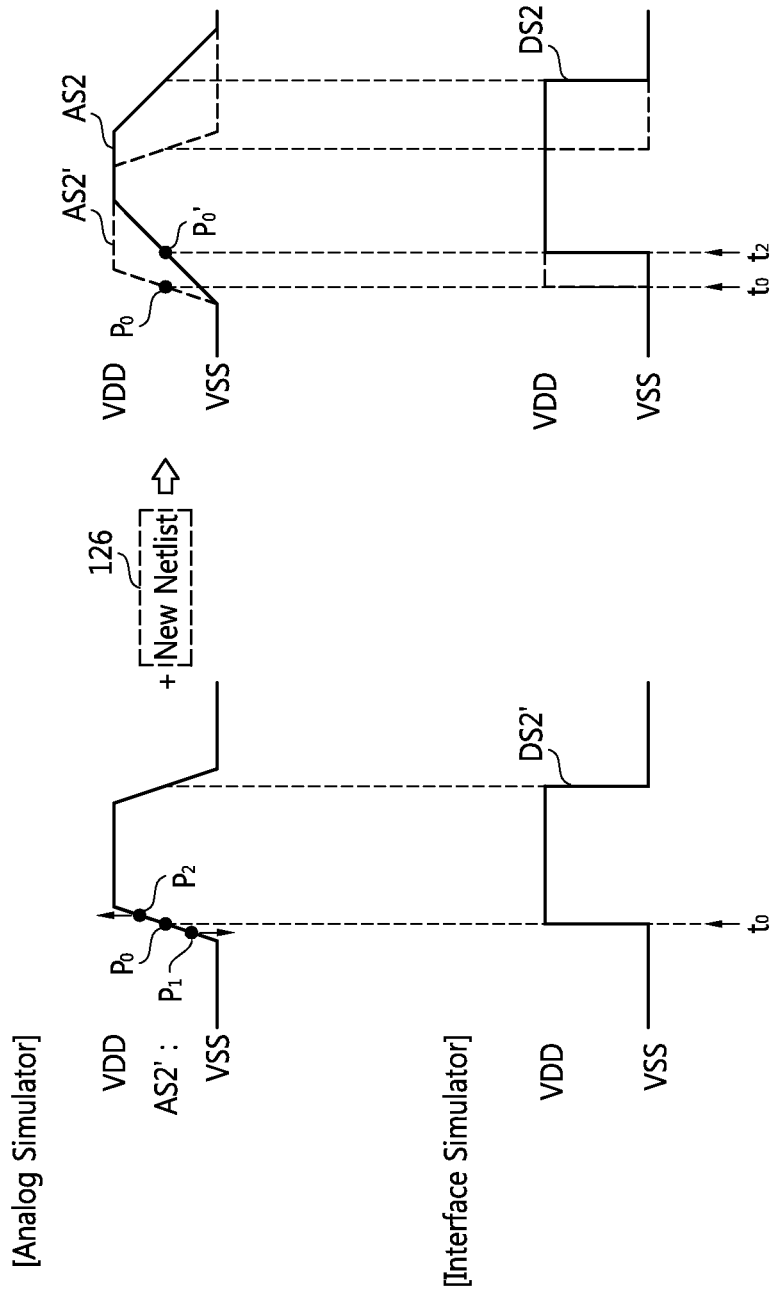
FIG. 10 is a diagram of a delay-compensated second analog signal and second event generated using a new netlist, according to various embodiments of the inventive concept.

The analog simulator 128 may generate a second analog signal AS2 for the second driving cell using the new netlist 126. Since the CL 114 has been reflected when the second analog signal AS2 is generated, Tr/Tf of the second analog signal AS2 is greater than Tr/Tf of an analog signal generated using the second net list 122. For example, the analog simulator 128 may be SPICE, but is not restricted thereto. When the second analog signal AS2 generated using the new netlist 126 is compared with an analog signal AS2' generated using the second net list 122, as shown in FIG. 10, Tr/Tf of the second analog signal AS2 is greater than Tr/Tf of the analog signal AS2'. A slope of the second analog signal AS2 reflecting the CL 114 may be slower than that of the analog signal AS2' that does not reflect the CL 114.

Referring to FIG. 2, the simulation device 200 includes the memory 210 and a processor 220, which may include a central processing unit (CPU) or other processing device (not shown) for executing computer programs, including software and software modules. The computer programs generally advance improvements in simulating performance of circuitry for electronic design automation (EDA), particularly in compensating for delay in D/A and A/D signal conversion to synchronize digital and analog signals. The memory 210 stores a simulator program, and may also store the first netlist 102, the timing LIB 104, the SPEF file 106, the SDF0 file 110, the Tr/Tf 112, the CL 114, and the second net list 122.

The processor 220 is configured to execute the simulator program, e.g., under control of the CPU or other processing device. The simulator program includes the delay calculator 108, the SDF file converter 116, the digital simulator 120, the netlist converter 124, the analog simulator 128, and the interface simulator 130, each of which comprises a computer program or set of instructions (e.g., including software and/or software modules) executable by the processor 220. For example, in various embodiments, each of the delay calculator 108, the SDF file converter 116, the digital simulator 120, the netlist converter 124, the analog simulator 128, the interface simulator 130, and corresponding process steps may be processing modules of the simulator program, respectively, executable by the processor 220. The modules may be implemented as any combination of software, hard-wired logic circuits and/or firmware configured to perform the designated operations. Software and software modules, in particular, may include code or code segments written in any of a variety of computing languages, and stored on non-transitory computer readable storage media, for example.

The delay calculator 108, the SDF file converter 116, the digital simulator 120, the netlist converter 124, the analog simulator 128, and the interface simulator 130 may be software or a computer program(s) executable by the processor 220. The delay calculator 108 may generate the SDF0 file 110, the Tr/Tf 112 and the CL 114 using the first netlist 102, the timing LIB 104 and the SPEF file 106 transmitted from the memory 210. The delay calculator 108 may store the SDF0 file 110, the Tr/Tf 112, and the CL 114 in the memory 210. The memory 210 may be formed by any non-transitory volatile memory and/or non-volatile memory.

When digital-to-analog signal conversion is performed by a simulator program executed in the processor 220, the SDF file converter 116 may generate the SDF1 file 118 using the SDF0 file 110 and the Tr/Tf 112, which have been read from the memory 210. The SDF file converter 116 may transmit the SDF1 file 118 to the digital simulator 120.

The digital simulator 120 may generate the first event DS1 using the SDF1 file 118 received from the SDF file converter 116 and the first netlist 102 received from the memory 210. The digital simulator 120 may transmit the first event DS1 to the interface simulator 130. The interface simulator 130 may convert the first event DS1 received from the digital simulator 120 into the first analog signal AS1. At this time, the interface simulator 130 may determine the waveform of the first analog signal AS1 using the Tr/Tf 112 received from the memory 210.

For example, the interface simulator 130 may reflect at least one of a predetermined Tr and a predetermined Tf on the first event DS1 to generate the first analog signal AS1. The interface simulator 130 may transmit the first analog signal AS1 to the analog simulator 128. The analog simulator 128 may perform an analog simulation using the first analog signal AS1 received from the interface simulator 130.

When analog-to-digital signal conversion is performed by a simulator program executed by the processor 220, the netlist converter 124 may generate the new netlist 126 using the CL 114 and the second net list 122, which have been received from the memory 210. The netlist converter 124 may transmit the new netlist 126 to the analog simulator 128.

The analog simulator 128 may generate the second analog signal AS2 using the new netlist 126 and may transmit the second analog signal AS2 to the interface simulator 130. The interface simulator 130 may convert the second analog signal AS2 into a digital signal, may generate a second event DS2 corresponding to the digital signal, and may transmit the second event DS2 to the digital simulator 120. The digital simulator 120 may perform a digital simulation using the second event DS2.

Figure 4:
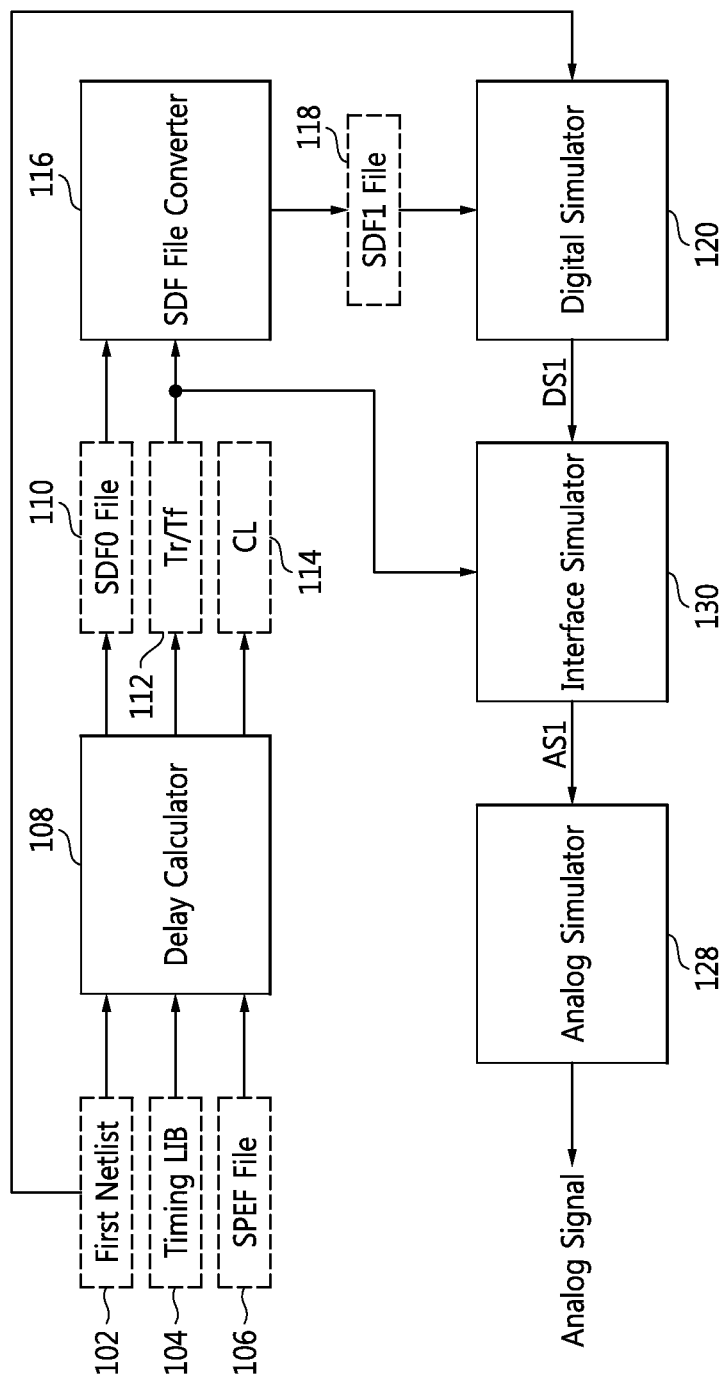
FIG. 4 is a conceptual diagram of a simulation of digital-to-analog signal conversion, according to various embodiments of the inventive concept.

FIG. 3 is a diagram of a circuit including the first driven cell 500A driven by the first driving cell 400A for digital-to-analog conversion. FIG. 4 is a conceptual diagram of a simulation of digital-to-analog signal conversion. Referring to FIG. 3, the first driving cell 400A in the digital domain may be connected with the first driven cell 500A in the analog domain through an interface region 600A for a simulation. The first driving cell 400A and the first driven cell 500A may generate different signals, respectively, through different simulators, respectively.

Figure 5:
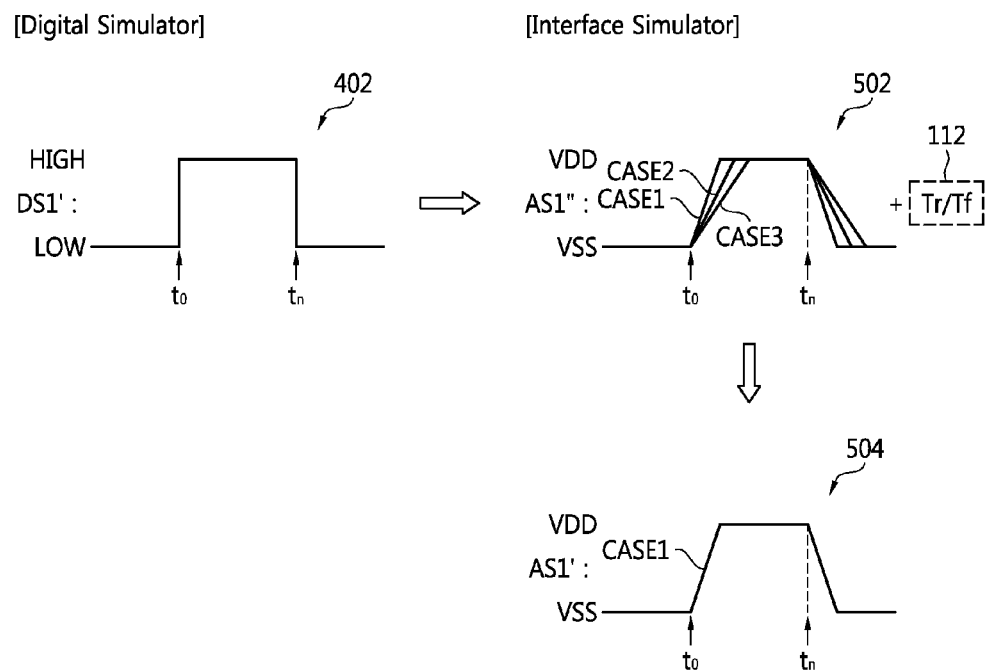
FIG. 5 is a conceptual diagram for explaining a method of converting a delay-uncompensated event into a delay-uncompensated analog signal, according to various embodiments of the inventive concept.

For example, referring to FIGS. 3 and 5, the first driving cell 400A may generate a delay-uncompensated event DS1' through the digital simulator 120 and the first driven cell 500A simulated by the analog simulator 128 may be simulated using a delay-uncompensated analog signal AS1'.

The interface simulator 130 may convert the delay-uncompensated event DS1' output from the digital simulator 120 into the delay-uncompensated analog signal AS1' in the interface region 600A. When the interface simulator 130 converts the delay-uncompensated event DS1' into the delay-uncompensated analog signal AS1', interconnect delay occurs in the analog signal AS1'. The SDF file converter 116 may generate the SDF1 file 118 using the SDF0 file 110 including a cell delay (or a cell delay description) and an interconnect delay (or an interconnect delay description) and one of Tr and Tf.

As described with reference to FIG. 1, the SDF file converter 116 may compensate the interconnect delay description using the difference between the interconnect delay description contained in the SDF0 file 110 and one of Tr and Tf, and may generate a compensated interconnect delay description. The compensated interconnect delay description may be determined by Equation 1:

$$A = C - \frac{B}{2}, \quad (1)$$

where A is the compensated interconnect delay description, C is the interconnect delay description, and B is either Tr or Tf.

The digital simulator 120 may generate the delay-compensated event DS1 using the SDF1 file 118 containing the compensated interconnect delay description and the first netlist 102. According to Equation 1, the first analog signal AS1 generated from the delay-compensated event DS1 leads the analog signal AS1' generated from the delay-uncompensated event DS1' by B/2.

FIG. 5 is a conceptual diagram for explaining a method of converting a delay-uncompensated event into a delay-uncompensated analog signal, according to an embodiment of the inventive concept. Referring to a part 402 showing the delay-uncompensated event DS1' generated by the digital simulator 120, the delay-uncompensated event DS1' transits from LOW to HIGH at a time point $t_0$ and transits from HIGH to LOW at a time point $t_n$. The digital simulator 120 transmits the delay-uncompensated event DS1' to the interface simulator 130.

Referring to part 502 in FIG. 5, the interface simulator 130 converts the delay-uncompensated event DS1' into an analog signal AS1'' having one waveform among different waveforms CASE1, CASE2 and CASE3. For example, the analog signal AS1'' may rise at the time point $t_0$ according to the Tr/Tf 112. The analog signal AS1'' may rise from a ground voltage VSS up to a supply voltage VDD. The analog signal AS1'' may fall at the time point $t_n$ according to the Tr/Tf 112. The analog signal AS1'' falls from the supply voltage VDD down to the ground voltage VSS.

The interface simulator 130 determines a waveform of the analog signal AS1'' using the Tr/Tf 112. The determined waveform may be one among the different waveforms CASE1, CASE2 and CASE3. The interface simulator 130 may convert the delay-uncompensated event DS1' into the analog signal AS1' having the determined waveform (e.g., CASE1), as shown in part 504, and transmits the analog signal AS1' to the analog simulator 128.

FIG. 6 is a diagram of a delay-compensated event in accordance with a delay-compensated interconnect delay description and a first analog signal corresponding to the event, according to an embodiment of the inventive concept. Referring to FIGS. 2, 5, and 6, the digital simulator 120 generates delay-uncompensated event DS1' transiting from LOW to HIGH at the time point $t_0$ as shown in the part 402 and transmits the delay-uncompensated event DS1' to the interface simulator 130.

As described above with reference to FIG. 5, the interface simulator 130 may generate the analog signal AS1'' having one waveform (e.g., CASE1) among different waveforms CASE1, CASE2, and CASE3 using the delay-uncompensated event DS1' and the Tr/Tf 112 as shown in part 502.

The interface simulator 130 converts the delay-uncompensated event DS1' into the analog signal AS1' having the waveform (e.g., CASE1) rising at the time point $t_0$ as shown in part 504. The analog signal AS1' rises from the ground voltage VSS up to the supply voltage VDD.

As shown in FIG. 6, the delay-uncompensated event DS1' and the analog signal AS1' having the waveform (e.g., CASE1) rise at the time point $t_0$. The transition time, i.e., the time point $t_0$ of a digital signal, of the event DS1' is supposed to be synchronized with half (i.e., 50%) of a rising time $t_A$ of the analog signal AS1'. At this time, the rising time $t_0$ may be defined by a difference between time points $t_0$ and $t_1$. For the sake of convenience in the description, it is assumed that a falling time is the same as the rising time $t_A$. However, when the event DS1' and the analog signal AS1' simultaneously rise at the time point $t_0$, an error of $t_A/2$ may occur. In other words, the delay-uncompensated analog signal AS1' lags behind the delay-compensated analog signal AS1 by $t_A/2$ on the basis of the time point $t_0$.

Referring to FIGS. 2 and 4, the delay-compensated first digital signal DS1 is converted into the delay-compensated first analog signal AS1 by the interface simulator 130. The analog simulator 128 may perform an analog simulation using the delay-compensated first analog signal AS1 to output an analog signal. When the interconnect delay description is compensated as described above, the error is eliminated according to Equation 1.

The digital simulator 120 generates the delay-compensated first event DS1 at a time point $t_2$, which is earlier than the time point $t_0$ by $t_A/2$, using the SDF1 file 118 containing the compensated interconnect delay description, as shown in part 404 in FIG. 6. The digital simulator 120 transmits the delay-compensated first event DS1 to the interface simulator 130.

The interface simulator 130 converts the delay-compensated first event DS1 into the delay-compensated first analog signal AS1. A median point $P_1$ of the delay-compensated first analog signal AS1 coincides with the middle of a rising time, i.e., Tr ($=t_A$) at the time point $t_0$, and therefore, the delay-compensated first analog signal AS1 leads the delay-uncompensated analog signal AS1' by $t_A/2$. The delay-compensated first analog signal AS1 reaches the supply voltage VDD at a time point $t_3$, which is $t_A/2$ after the time point $t_0$.

FIG. 7 is a timing chart of delay-uncompensated signals and delay-compensated signals illustrated in FIG. 6. FIG. 7 shows the delay-uncompensated event DS1', and the delay-uncompensated analog signal AS1' for the delay-uncompensated event DS1'. FIG. 7 also shows the delay-compensated first event DS1 in accordance with the compensated interconnect delay description, and the delay-compensated first analog signal AS1 for the delay-compensated first event DS1.

The first event DS1 and the first analog signal AS1, which have reflected the compensated interconnect delay description, start transition at the time point $t_2$, which is earlier that the time point $t_0$ by $t_A/2$. However, the delay-uncompensated event DS1' and the delay-uncompensated analog signal AS1' start transition at the time point $t_0$. In other words, the first event DS1 and the first analog signal AS1 start transition at the time point $t_2$ earlier that the time point $t_0$ by $t_A/2$.

As shown in FIG. 7, the transition point of the delay-uncompensated event DS1' is synchronized with the middle point $P_1$ of the rising time $t_A$ of the analog signal AS1 at the time point $t_0$. At this time, the rising time $t_A$ may be defined by a difference between the time points $t_2$ and $t_3$. Since the transition point of the delay-uncompensated event DS1' is synchronized with a point corresponding to 50% of the rising time $t_A$, an error of $t_A/2$ is eliminated. In other words, an error that may occur during digital-to-analog signal conversion is eliminated in the embodiments of the inventive concept.

FIG. 8A is a diagram of a conventional circuit including a second driven cell 400B driven by a second driving cell 500B for analog-to-digital signal conversion. FIG. 8B is a diagram of a circuit including a second driven cell 400C driven by a second driving cell 500C for analog-to-digital signal conversion according to various embodiments of the inventive concept. Referring to FIG. 8A, the second driving cell 500B in the analog domain is connected with the second driven cell 400B in the digital domain through an interface region 600B in the conventional simulation. Each of the interface regions 600A and 600B may be the interface simulator 130.

The second driven cell 400B includes a compensation capacitor 410 to compensate for delay occurring due to an inverter or the like. However, since the second driving cell 500B and the second driven cell 400B generate signals using different simulators, respectively, the second driving cell 500B performs a simulation without taking the compensation capacitor 410 included in the second driven cell 400B into account.

In the circuit structure shown in FIG. 8A, the analog simulator 128 may generate a delay-uncompensated analog signal AS2' having shorter Tr and Tf than an expected analog signal. The interface simulator 130 may convert the delay-uncompensated analog signal AS2' into a delay-uncompensated event DS2'. Referring to FIG. 8B, a simulator program performed by the simulation device 200 according to various embodiments of the inventive concept compensates the second driving cell 500C in the analog domain for a CL.

In the circuit structure shown in FIG. 8A, the analog simulator 128 cannot recognize or reflect a capacitance of the compensation capacitor 410 included in the second driven cell 400B. Accordingly, the delay-uncompensated analog signal AS2' generated by the analog simulator 128 has shorter Tr and Tf than an expected analog signal. However, according to various embodiments of the inventive concept, the analog simulator 128 generates or recognizes the circuit structure illustrated in FIG. 8B using the new netlist 126. Accordingly, the second driving cell 500C includes a CL corresponding to the compensation capacitor 410, so that a delay occurring in the second driven cell 400C is compensated for.

Figure 9:
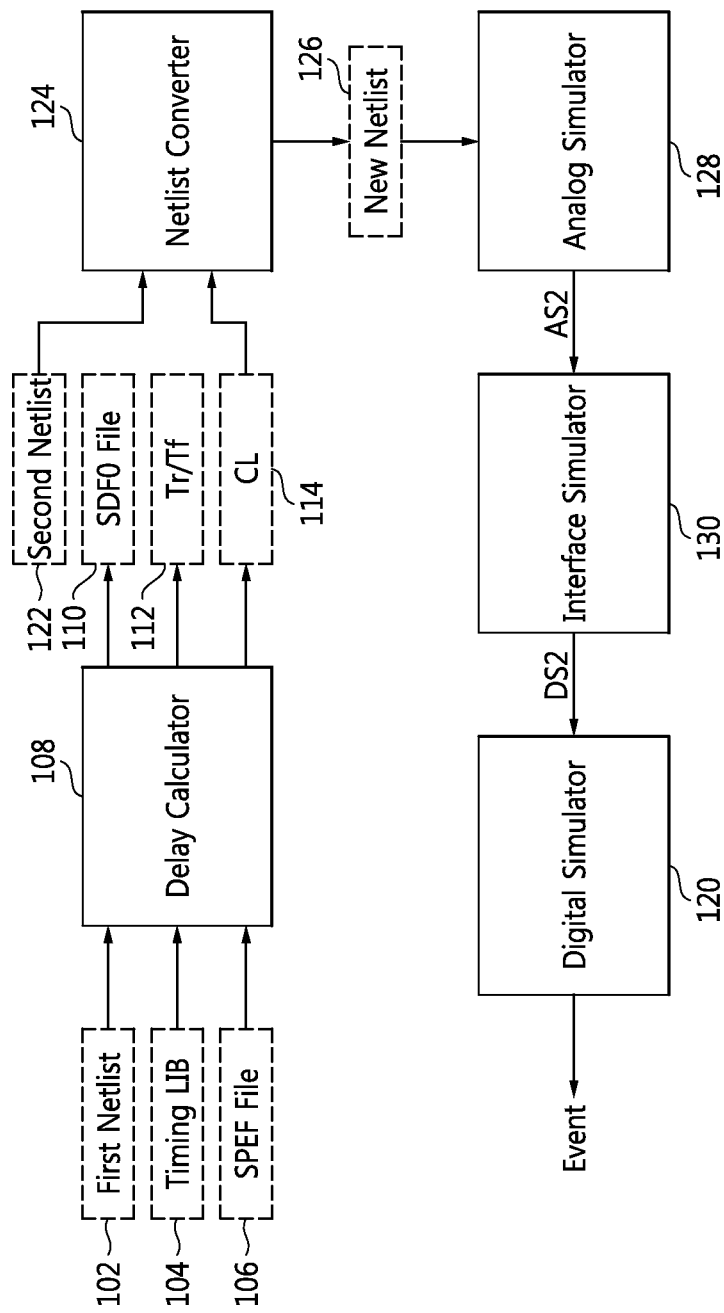
FIG. 9 is conceptual diagram of simulation of analog-to-digital signal conversion, according to various embodiments of the inventive concept.

FIG. 9 is conceptual diagram of simulation of analog-to-digital signal conversion according to various embodiments of the inventive concept. Referring to FIGS. 2 and 9, the analog simulator 128 generates the delay-compensated second analog signal AS2 shown in FIG. 10 using the new netlist 126. The interface simulator 130 generates the delay-compensated second event DS2 using the delay-compensated second analog signal AS2. The digital simulator 120 performs a digital simulation using the delay-compensated second event DS2 and outputs a simulation result.

When the processor 200 performs analog-to-digital signal conversion, the netlist converter 124 generates the new netlist 126 using the CL 114 and the second netlist 122 which have been read from the memory 210. The CL 114 corresponds to a delay occurring in the second driven cell 400C. Accordingly, the netlist converter 124 generates the new netlist 126 by applying the CL 114 to the second netlist 122. The analog simulator 128 may adjust the Tr of an analog signal using the new netlist 126 to generate the delay-compensated second analog signal AS2.

As shown in FIGS. 8B and 10, since the CL 114 corresponding to the compensation capacitor 410 is applied to the second driving cell 500C, the Tr or Tf of the delay-compensated second analog signal AS2 may be longer than the Tr or Tf of the delay-uncompensated second analog signal AS2'.

The analog simulator 128 transmits the delay-compensated second analog signal AS2 to the interface simulator 130. The interface simulator 130 converts the delay-compensated second analog signal AS2 into the delay-compensated second event DS2. For example, the delay-compensated second event DS2 may be generated with a delay, lagging behind the delay-uncompensated event DΩ', as shown in FIG. 10. The delay corresponds to the CL 114 compensated for in the new netlist 126. The interface simulator 130 transmits the delay-compensated second event DS2 to the digital simulator 120. The digital simulator 120 may perform a simulation using the delay-compensated second event DS2.

FIG. 10 is a diagram of the delay-compensated second analog signal AS2 and the delay-compensated second event DS2 generated using the new netlist 126. Referring to FIGS. 9 and 10, the analog simulator 128 generates the delay-uncompensated analog signal AS2' using the second netlist 122.

The interface simulator 130 converts the delay-uncompensated analog signal AS2' into the delay-uncompensated event DS2'. In detail, the interface simulator 130 may generate the delay-uncompensated event DS2' at a median point $P_0$ of the delay-uncompensated analog signal AS2', that is, at the time point $t_0$.

When the level of the analog signal AS2' is $P_1$, the event DS2' may be LOW and when the level of the analog signal AS2' is $P_2$, the event DS2' may be HIGH. The analog simulator 128 generates the delay-compensated second analog signal AS2 using the new netlist 126. A slope of the delay-compensated second analog signal AS2 is lower than that of the delay-uncompensated analog signal AS2'. Since the delay-compensated second analog signal AS2 reflects the CL 114, the Tr and/or Tf of the delay-compensated second analog signal AS2 is longer than that of the delay-uncompensated analog signal AS2'.

The interface simulator 130 may generate the delay-compensated second event DS2 at a median point $P_0'$ of the delay-compensated second analog signal AS2, that is, at the time point $t_2$, which is later than the time point $t_0$.

Figure 11:
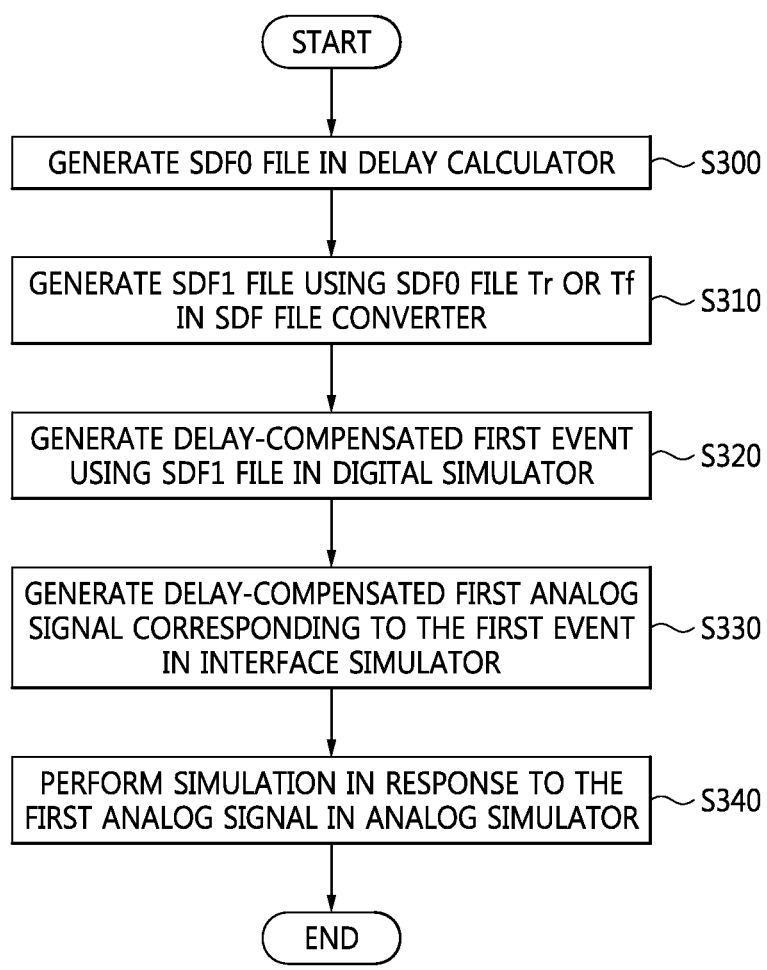
FIG. 11 is a flowchart of digital-to-analog signal conversion, according to various embodiments of the inventive concept.

FIG. 11 is a flowchart of digital-to-analog signal conversion according to various embodiments of the inventive concept. Referring to FIGS. 1 through 7 and FIG. 11, the delay calculator 108 generates the Tr/Tf 112 and the SDF0 file 110 using the first netlist 102, the timing LIB 104, and the SPEF file 106 in operation S300.

The SDF file converter 116 generates the SDF1 file 118 using the SDF0 file 110 and one of a rising time Tr and a falling time Tf in operation S310. The digital simulator 120 generates the delay-compensated first event DS1 using the SDF1 file 118 in operation S320. The interface simulator 130 converts the delay-compensated first event DS1 received from the digital simulator 120 into the delay-compensated first analog signal AS1 using Tr or Tf in operation S330. The analog simulator 128 may perform a simulation in response to the delay-compensated first analog signal AS1 received from the interface simulator 130 in operation S340.

Figure 12:
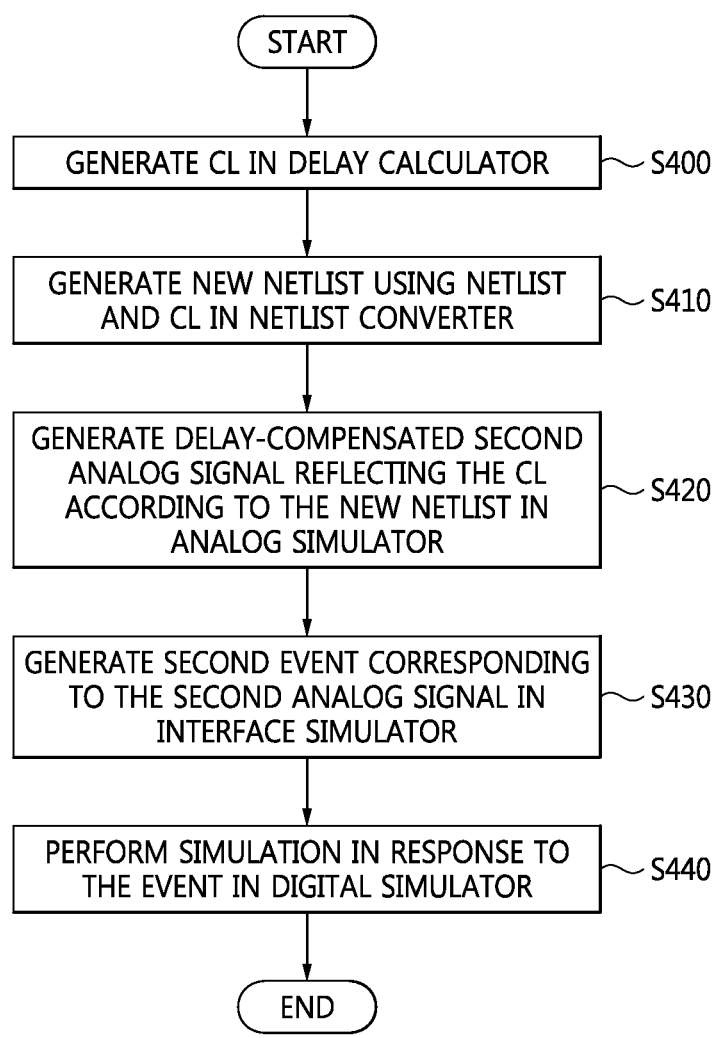
FIG. 12 is a flowchart of analog-to-digital signal conversion, according to various embodiments of the inventive concept.

FIG. 12 is a flowchart of analog-to-digital signal conversion according to various embodiments of the inventive concept. Referring to FIGS. 1, 2, 8B, 9, 10, and 11, the delay calculator 108 generates the CL 114 using the first netlist 102, the timing LIB 104, and the SPEF file 106 in operation S400.

The netlist converter 124 generates the new netlist 126 using the second netlist 122 and the CL 114 in operation S410. The analog simulator 128 generates the delay-compensated second analog signal AS2 reflecting the CL 114 according to the new netlist 126 in operation S420. The interface simulator 130 generates the delay-compensated second event DS2 corresponding to the delay-compensated second analog signal AS2 in operation S430. The digital simulator 120 may perform a simulation in response to the delay-compensated second event DS2 in operation S440.

As described above, according to various embodiments of the inventive concept, a method of operating a simulator adjusts a delayed analog signal of a driven cell during digital-to-analog signal conversion and adjusts an analog waveform of a driving cell during analog-to-digital signal conversion, compensating for delay, thereby synchronizing a digital signal and an analog signal with each other. Since the digital signal and the analog signal are synchronized with each other, error between a simulation result of a digital simulator, which simulates a digital domain, and a simulation result of an analog simulator which simulates an analog domain is reduced.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method of operating a computerized simulator including a memory that stores instructions and a processor that executes the instructions, while compensating for delay from at least one of digital-to-analog signal conversion and analog-to-digital signal conversion for synchronizing digital and analog signals, the method comprising:
   generating, using the processor of the computerized simulator, a standard delay format (SDF) file and one of a rising time and a falling time of an analog signal in the digital-to-analog signal conversion or the analog-to-digital signal conversion, using a first netlist, a timing library, and a standard parasitic exchange format (SPEF) file;
   adjusting an interconnect delay description included in the SDF file to compensate for delay using the one of the rising time and the falling time; and
   generating an event to be used in a simulation, using a first driving cell according to a compensated interconnect delay description.

2. The method of claim 1, wherein the first netlist is a netlist of Verilog.

3. The method of claim 1, wherein the SDF file is defined in Institute of Electrical and Electronics Engineers (IEEE) Standard 1497.

4. The method of claim 1, wherein the interconnect delay description comprises a delay of at least one interconnect connected to at least one terminal among input and output terminals of the first driving cell.

5. The method of claim 1, further comprising:
   generating an analog signal using the event and the one of the rising time and the falling time using an interface simulator; and
   driving a first driven cell using the analog signal using an analog simulator.

6. The method of claim 5, wherein the generated analog signal reflects the one of the rising time and the falling time corresponding to the event.

7. The method of claim 5, wherein the analog simulator is a simulation program with integrated circuit emphasis (SPICE).

8. The method of claim 1, wherein adjusting the interconnect delay description is based on a difference between the interconnect delay description and the one of the rising time and the falling time.

9. The method of claim 1, wherein adjusting the interconnect delay description is based on equation $A=C-B/2$, where A is the adjusted interconnect delay description, C is the interconnect delay description, and B is the one of the rising time and the falling time.

10. The method of claim 1, wherein the SPEF file is supported by at least part of Institute of Electrical and Electronics Engineers (IEEE) Standard 1481-1999.

11. The method of claim 1, further comprising:
    generating an effective capacitance load using the first netlist and the timing library;
    generating a new netlist using a second netlist and the effective capacitance load; and
    generating an analog signal reflecting the effective capacitance load using a second driving cell according to the new netlist.

12. A non-transitory computer-readable recording medium containing a computer program, executable by a processing device of a simulator, for compensating for delay from at least one of digital-to-analog signal conversion and analog-to-digital signal conversion for synchronizing digital and analog signals for the simulator, the computer readable medium comprising:

a delay calculating code segment that generates, when executed by a processor of the processing device, a standard delay format (SDF) file and one of a rising time and a falling time of an analog signal in the digital-to-analog signal conversion or the analog-to-digital signal conversion, using a first netlist, a timing library and a standard parasitic exchange format (SPEF) file;

an SDF file converting code segment that adjusts an interconnect delay description included in the SDF file to compensate for delay using the one of the rising time and the falling time; and a digital simulator code segment that generates an event to be used in a simulation using a first driving cell according to a compensated interconnect delay description.

13. The computer-readable medium of claim 12, wherein the delay calculating code segment further generates an effective capacitance load using the first netlist and the timing library, the computer-readable recording medium further comprising;

a netlist converter code segment for generating a new netlist using a second netlist and the effective capacitance load; and an analog simulator code segment for generating an analog signal reflecting the effective capacitance load using a second driving cell according to the new netlist.

14. A simulator comprising:

a memory for storing a first netlist, a timing library, and a standard parasitic exchange format (SPEF) file; and a processor configured to compensate for delay in synchronizing digital and analog signals, the processor comprising:

a delay calculator module that generates a standard delay format (SDF) file and one of a rising time and a falling time of an analog signal in digital-to-analog signal conversion or analog-to-digital signal conversion in the synchronizing, using the first netlist, the timing library, and the SPEF file;

an SDF file converter module that adjusts an interconnect delay description included in the SDF file to compensate for delay using the one of the rising time and the falling time; and a digital simulator module that generates an event to be used in a simulation using a first driving cell according to a compensated interconnect delay description.

15. The simulator of claim 14, further comprising:

an interface simulator module for generating an analog signal using the event and the one of the rising time and the falling time; and an analog simulator module for driving a first driven cell using the analog signal.

16. The simulator of claim 15, wherein generating the analog signal comprises the interface simulator generating the analog signal reflecting the one of the rising time and the falling time corresponding to the event.

17. The simulator of claim 14, wherein the SDF file converter module adjusts the interconnect delay description based on a difference between the interconnect delay description and the one of the rising time and the falling time.

18. The simulator of claim 14, wherein the digital simulator module is formed with a Verilog hardware description language (HDL).

19. The simulator of claim 14, wherein the delay calculator module, the SDF file converter module, and the digital simulator module are implemented using software programs executable by a central processing unit (CPU).

20. The simulator of claim 14, wherein the delay calculator module further generates an effective capacitance load using the first netlist and the timing library, the simulator further comprising;

a netlist converter module for generating a new netlist using a second netlist and the effective capacitance load; and an analog simulator module for generating an analog signal reflecting the effective capacitance load using a second driving cell according to the new netlist.

* * * * *